United States Patent [19]

Ballard et al.

[11] Patent Number: 4,937,825
[45] Date of Patent: Jun. 26, 1990

[54] METHOD AND APPARATUS FOR DIAGNOSING PROBLEMS IN DATA COMMUNICATION NETWORKS

[75] Inventors: Christopher P. Ballard, Rome, Italy; Rodney Bell; William V. Evans, Jr., both of Raleigh, N.C.; Curtis J. Frantz, Durham, N.C.; John D. Hajian, Holly Springs, N.C.; William G. Kreps, III, Raleigh, N.C.; Ronald D. Martin; Barbara A. Smith, both of Durham, N.C.; Marshall E. Sprague, Raleigh, N.C.; James B. Staton, III, Greensboro, N.C.; John G. Stevenson, Raleigh, N.C.; Petre N. Turcu, Cary, N.C.; Raymond C. Williams, Raleigh, N.C.

[73] Assignee: International Business Machines, Armonk, N.Y.

[21] Appl. No.: 207,097

[22] Filed: Jun. 15, 1988

[51] Int. Cl.$^5$ .............................................. G06F 11/00
[52] U.S. Cl. .................................. 371/20.1; 371/15.1; 364/200
[58] Field of Search ...................... 371/20, 22, 15, 29, 371/23, 27, 20.5, 20.1, 20.6, 22.6, 15.1, 29.1; 324/73 R, 73 AT; 370/13, 17; 375/10; 455/67; 379/27, 29; 364/200, 900

[56] References Cited

U.S. PATENT DOCUMENTS

| | | | |
|---|---|---|---|
| 3,510,843 | 5/1970 | Bennett | 364/200 |
| 4,025,906 | 5/1977 | Riikonen | 364/200 |
| 4,315,310 | 2/1982 | Bayliss | 364/200 |
| 4,484,030 | 11/1984 | Gavrilovich | 379/27 X |
| 4,586,158 | 4/1986 | Brandle | 364/900 |
| 4,736,375 | 4/1988 | Tannhauser | 371/27 |

OTHER PUBLICATIONS

D. Couch, "Measuring the Performance of a Mixed-Vendor Ethernet", Data Communications, 8/1987 139-145.

A. Tanenbaum, "Computer Networks", 2nd ed. 1988, pp. 325-331.

Primary Examiner—Jerry Smith
Assistant Examiner—Robert W. Beausoliel
Attorney, Agent, or Firm—Edward H. Duffield

[57] ABSTRACT

Data communications neworks may be composed of many different physical devices linked together in various layers and using various protocols for communication. The multiple physical elements that make up such communication networks or links are often supplied by diverse vendors. As a result, isolation and diagnosis of communication failures becomes an extremely difficult and cumbersome process. The present system and method simplify the process greatly by premitting a system control operator or control application program to issue generic, non-device-specific problem isolation, control or diagnostic commands to the communication neetwork by identifying the link and target node for which problem isolation and diagnosis is required. The non-device-specific commands are received first at an intermediáte translation facility which retrieves communication link physical configuration data and identifies the physical components and characteristics thereof that make up that communication link to the identified target node. The translation facility then issues one or more device-specific problem determination commands on the communication link directed toward said node. It receives one or more device-specific responses from one or more physcial devices in the communication link and, responsive thereto, either issues further device-specific commands on the communication link to complete the diagnosis or issues generic, non-device-specific problem identification results as responses to the requesting control nodes' initial request.

11 Claims, 14 Drawing Sheets

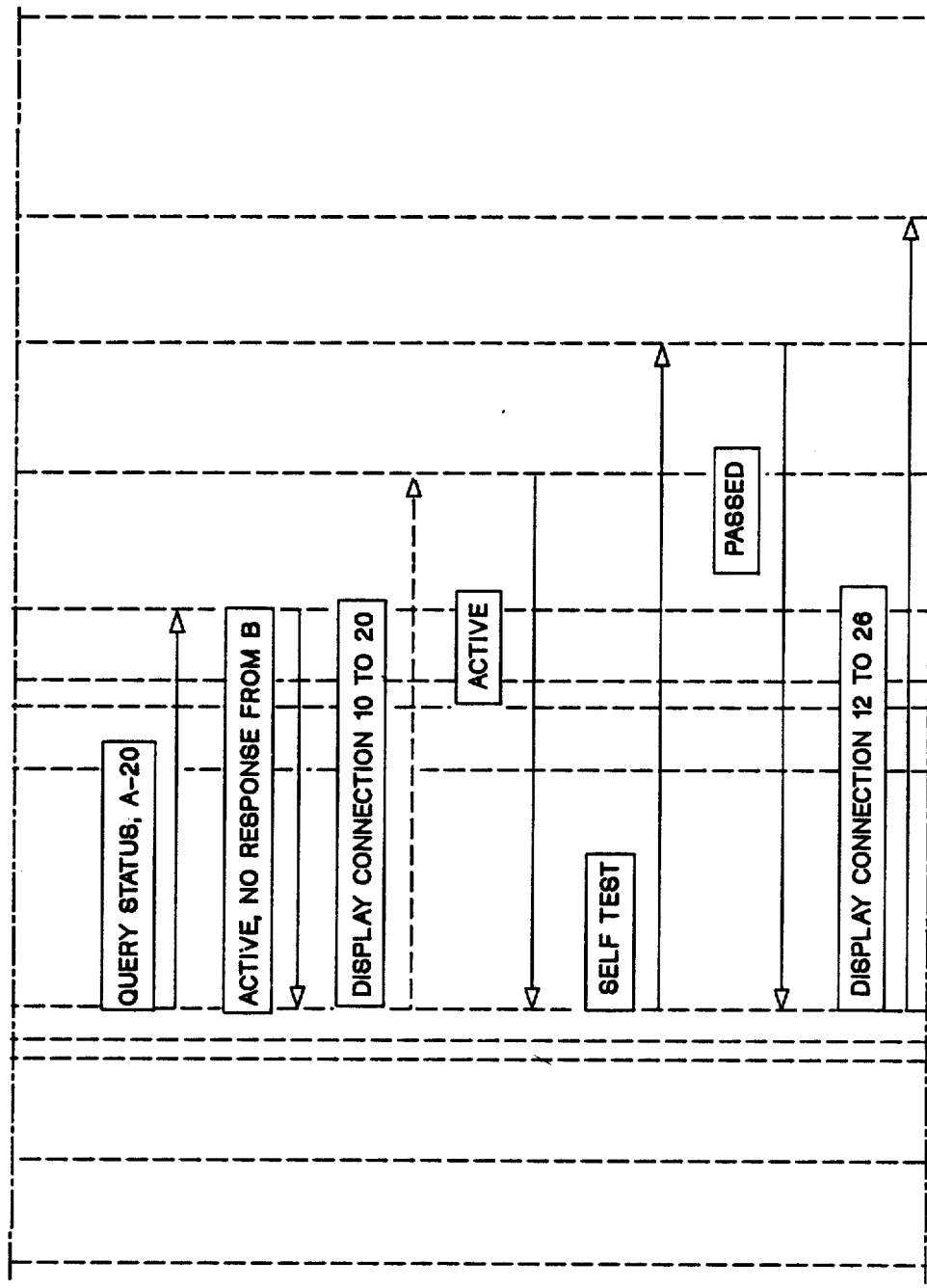

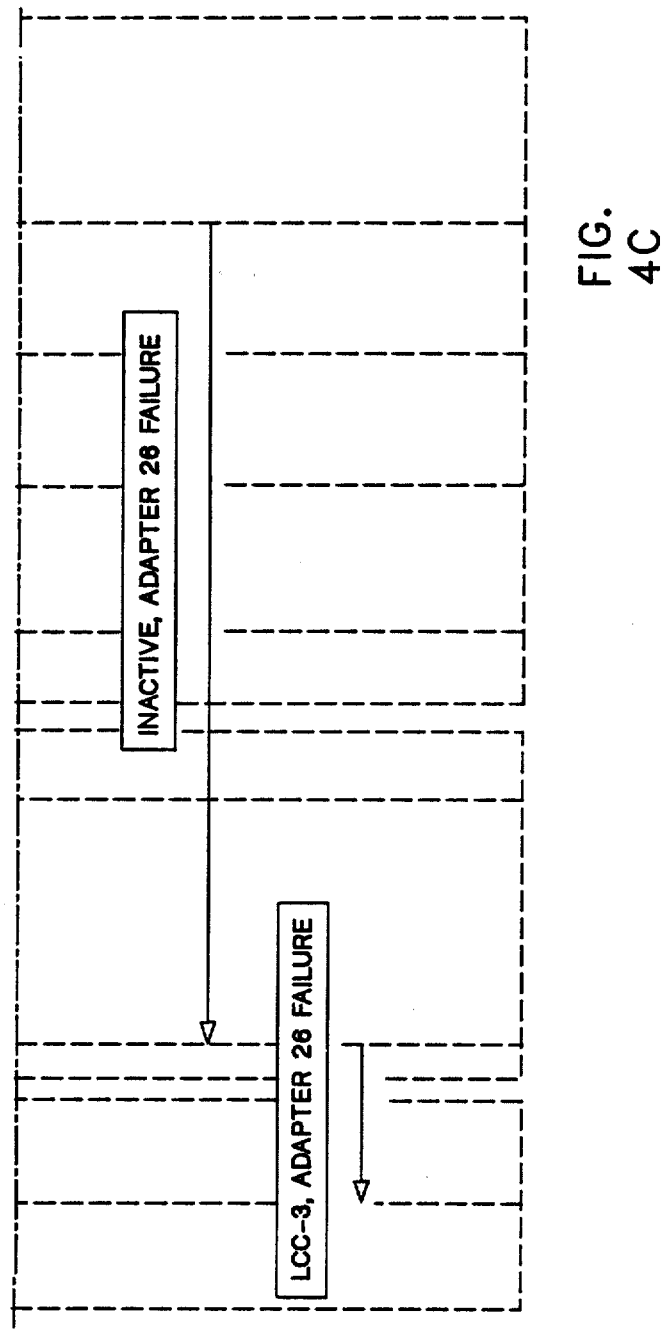
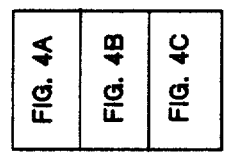
FIG. 4C
FIG. 4

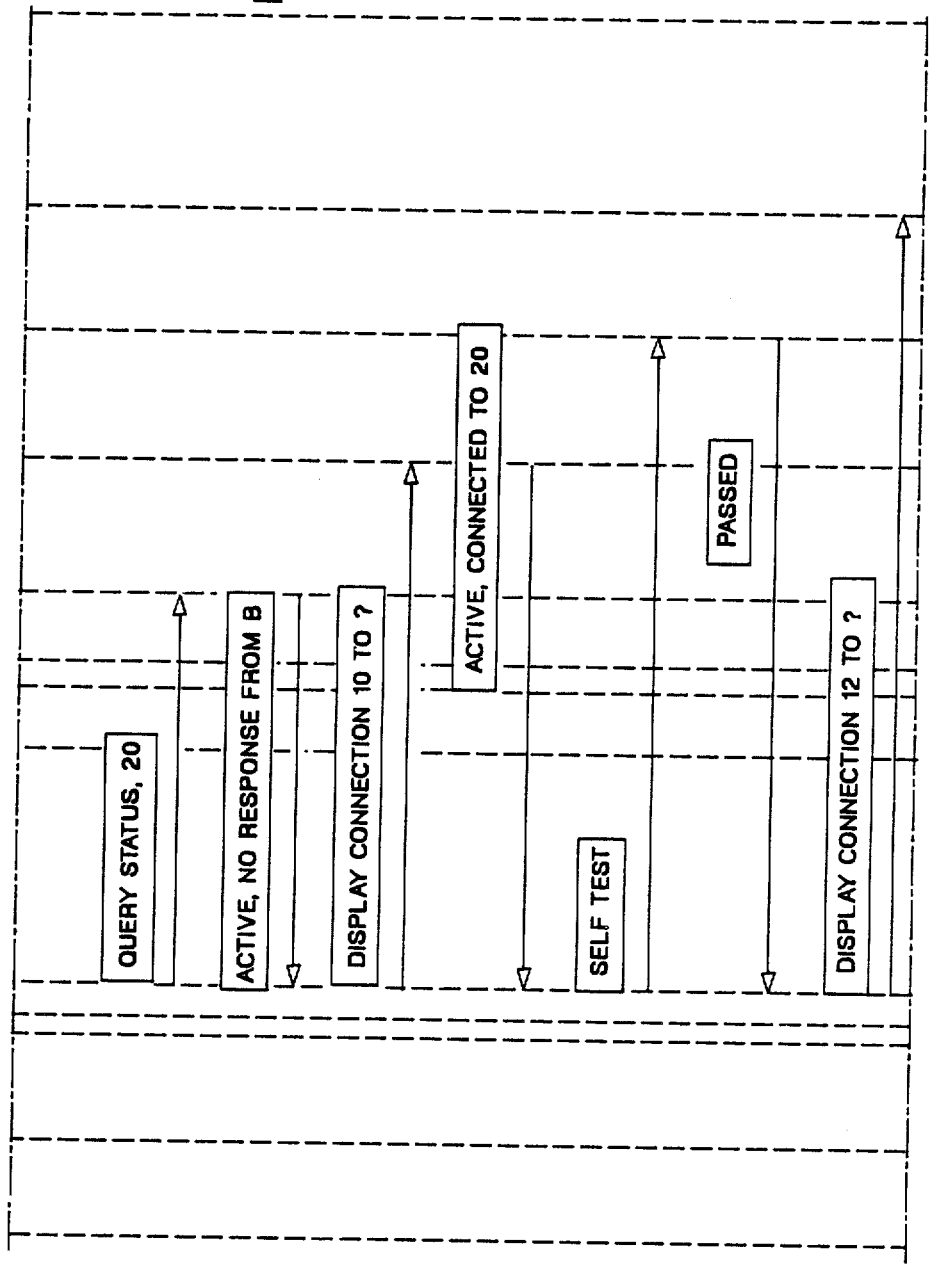

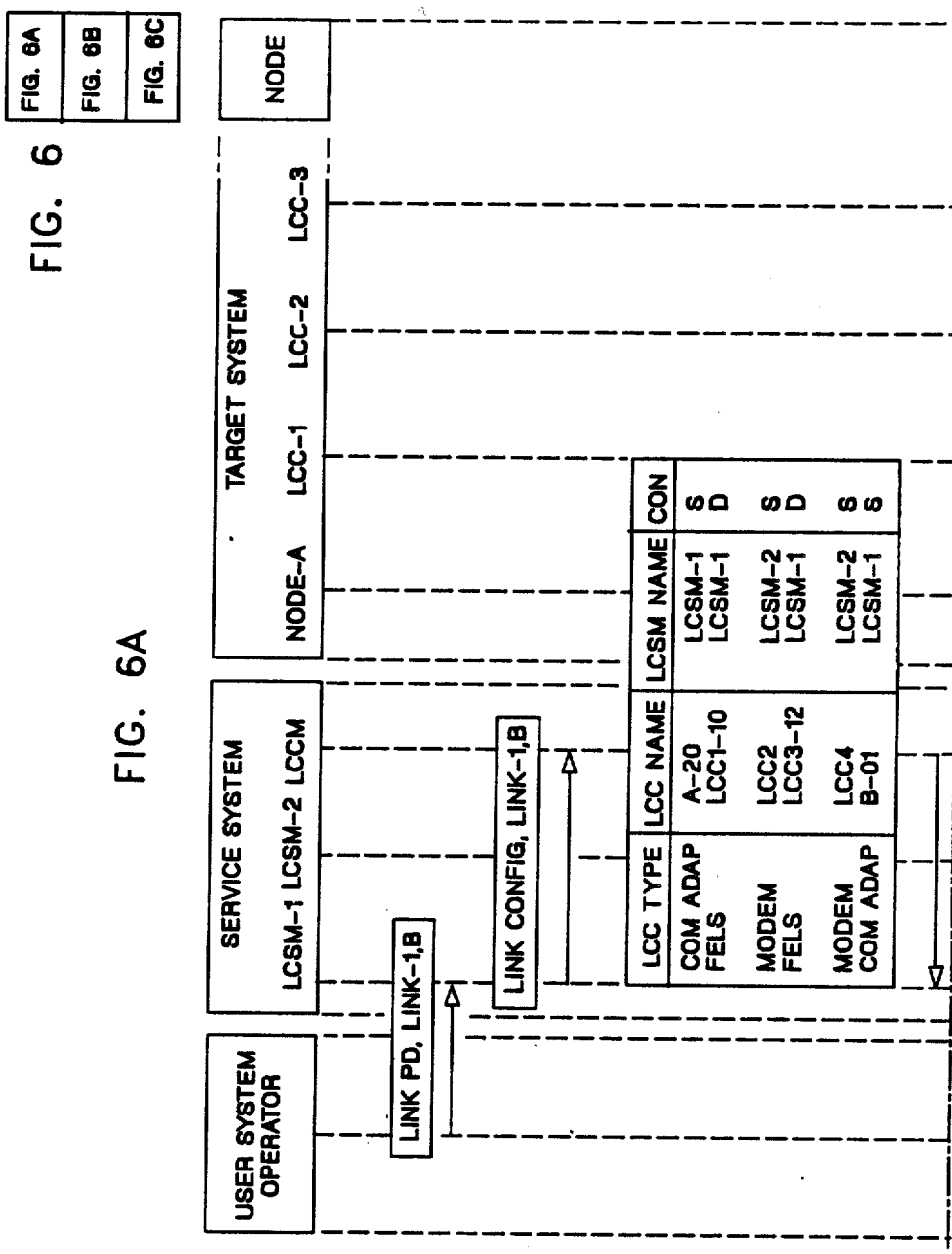

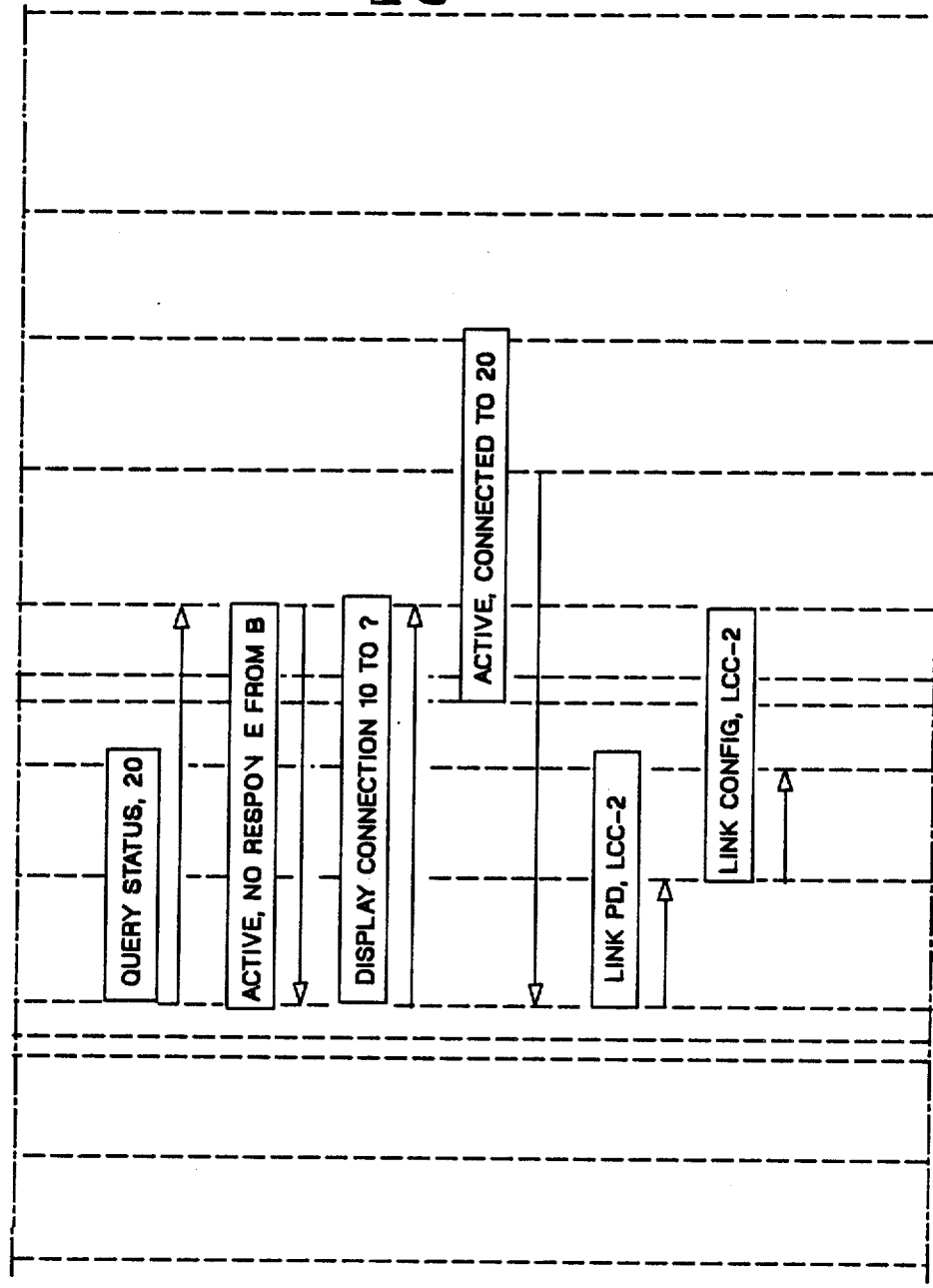

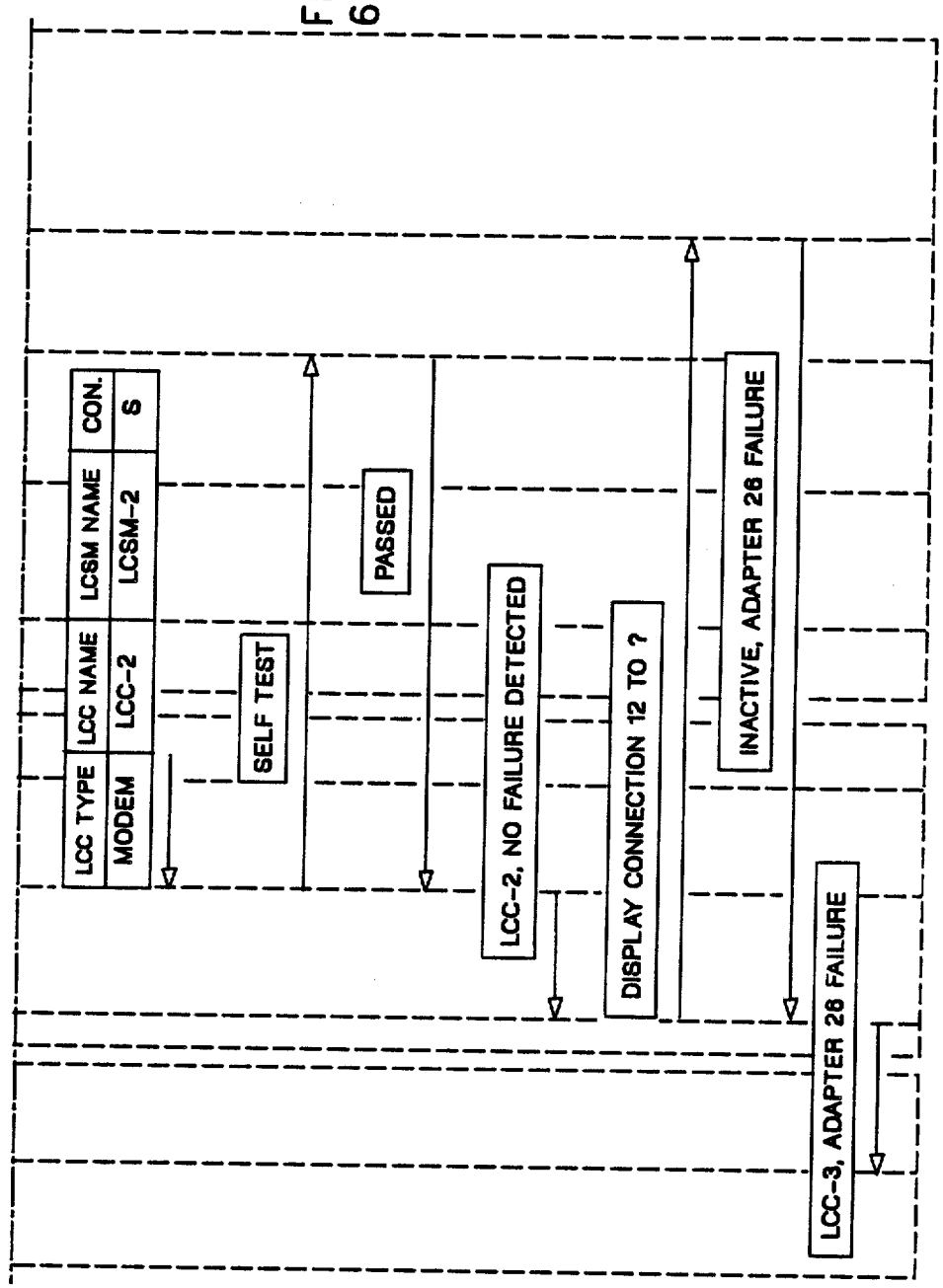

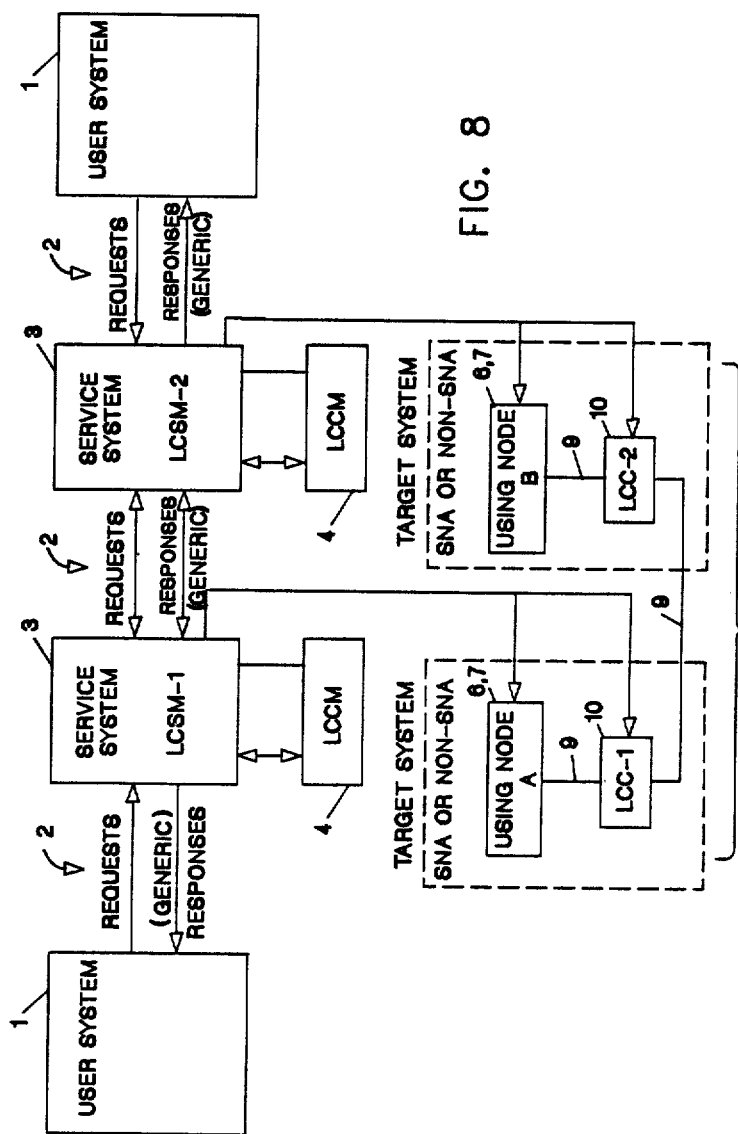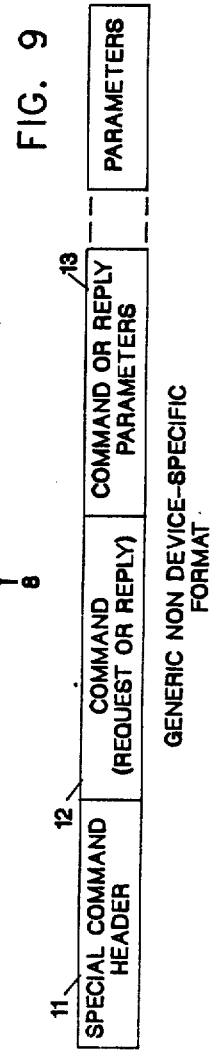

METHOD AND APPARATUS FOR DIAGNOSING PROBLEMS IN DATA COMMUNICATION NETWORKS

FIELD OF THE INVENTION

This invention relates to data communication network management apparatus and methods that provide a processing system for isolation, diagnosis and control of communication problems or faults in the communication link sources.

PRIOR ART

Numerous prior network link management problem diagnosis methods and devices exist in the field. These generally are designed in a manner specific to the particular physical devices that make up the data communication links. In telephone systems in general, loop back signals may be transmitted from a controlling node to the various elements making up the communciation link to a target node, and signals may be propagated down the communication link to be looped back by devices in the line which are operating correctly and which can respond to the loop back commands to the control node. Such processes are, however, totally inappropriate when the data communication network devices operate under differing protocols, are supplied by different vendors and have differing diagnostic or data providing capabilities.

More sophisticated techniques are also in existence where the data communication network contains devices supplied by the vendors of the host data node or control node systems. For example, the IBM Corporation markets components for a data communication system including host system mainframe computers, operator control consoles and communication network control program applications that can communicate with and diagnose problems occurring in a data communication network that includes IBM supplied modems, multiplexers, switches and the like. However, these systems share a common system architecture and communication protocol and are thus amenable to a single diagnostic application program and protocol. They avoid the difficulty encountered as mentioned above, with numerous protocols and numerous physical devices supplied by diverse vendors. Such uniform systems are, however, not often achieved and in many networks constructed by users and purchasers of various components, such uniformity cannot be brought about without major reinvestment.

It is therefore desirable that some method and system apparatus be provided that is capable of accommodating the more usually encountered data communication networks which are constructed of multiple layers of various vendors' physical devices having diverse capabilities and communication protocols.

OBJECTS OF THE INVENTION

It is an object of this invention to provide an improved method and apparatus for isolating and diagnosing problems in data communication networks. It is furthr an object to provide an improved diagnostic system in which the controlling node may issue generic problem determination requests to an intermediate translation facility having access to data concerning the physical configuration and characteristics of the network components which comprise a link to an identified target node experiencing a problem, and which intermediate facility can translate the generic and non-device-specific requests for diagnoses into device-specific commands addressed to particular devices in the link and which can receive from such devices specific responses which may be retranslated back into generic problem determination responses to the requesting host operator or control program.

BRIEF SUMMARY

The foregoing and still other objects not specifically enumerated are provided by the present invention in an architecturally designed system utilizing a novel communications technique. The system comprise a host or operator that is responsible for generating generic control or problem determination diagnostic requests. These requests are issued in their generic form in a non-device-specific format. The data communications system contains an intermediate control and translation facility that intercepts the generic problem determination requests from the operator or user system. The translation facility has access to physical configuration data files that constitute a network map and contain information for each link under the translation control's responsibility. This identifies, for each physical device constituting each communication link within its purview, the salient characteristics thereof including the, communication protocol requirements, capabilities and physical location or addresses for each such device. The translation control facility accesses these data files for an identified target node and link in response to a generic request from the host operator or user system. It then issues one or more device-specific addressed problem isolation, determination or control commands onto the communication link. It receives device-specific responses from devices which it is capable of accessing utilizing the information from the physical configuration data base. This intermediate translation and control facility then may issue still further commands to specific physical devices until the problem situation has been isolated and identified (and perhaps resolved by implementation of an avoidance technique such as switching to another communication link) and it retranslates the results into generic non-device-specific problem determination results which are responsive to the original generic request from the host operator or application. It transmits these non-device-specific generic responses back to the requester. The responses identify the source of the problem and indicate to the system operator or control program which measures have been taken or need to be taken to recover from the problem situation.

BRIEF DESCRIPTION OF DRAWINGS

The invention will be described with respect to a preferred embodiment thereof which is further illustrated and described in the drawings in which:

FIG. 4 is a schematic layout showing how FIGS. 4A through 4C are to be assembled to create a single drawing.

FIGS. 4A-4C are a problem determination example flow chart assembled as shown in FIG. 4 showing how the intermediate translation facility organizes the diagnostic processes and communications with the various link components with on LCSM and static connections.

FIGS. 5A-5C are to be assembled together into a single drawing.

FIGS. 5A-5C illustrate a portion of another diagnostic flow chart example with on LCSM and dynamic and static connections.

FIG 6 is a schematic layout showing how FIGS. 6A-6C are to be assembled together into a single drawing.

FIGS. 6A-6C illustrate yet another diagnostic flow chart example with two LCSMs and dynamic and static connections.

FIG. 8 illustrates multiple diagnostic and control facilities interconnected in a peer network configuration.

FIG. 9 illustrates schematically a generic request or response message format.

DETAILED SPECIFICATION

The present invention provides a method and apparatus for allowing a data communication system or network operator or even an automated applications program running in the host or control system to provide problem determination and management in the physical computer data communcations links and connections. The method devised does not require that the system operator "understand" the physical components that make up the communication link connections in the system. By "understand", it is meant that neither the system physical component types or identities that make up a given communications link nor the specific commands, formats or responses that the components are capable of receiving or providing need be known to the operator or to the diagnostic applications program.

Figure 1:
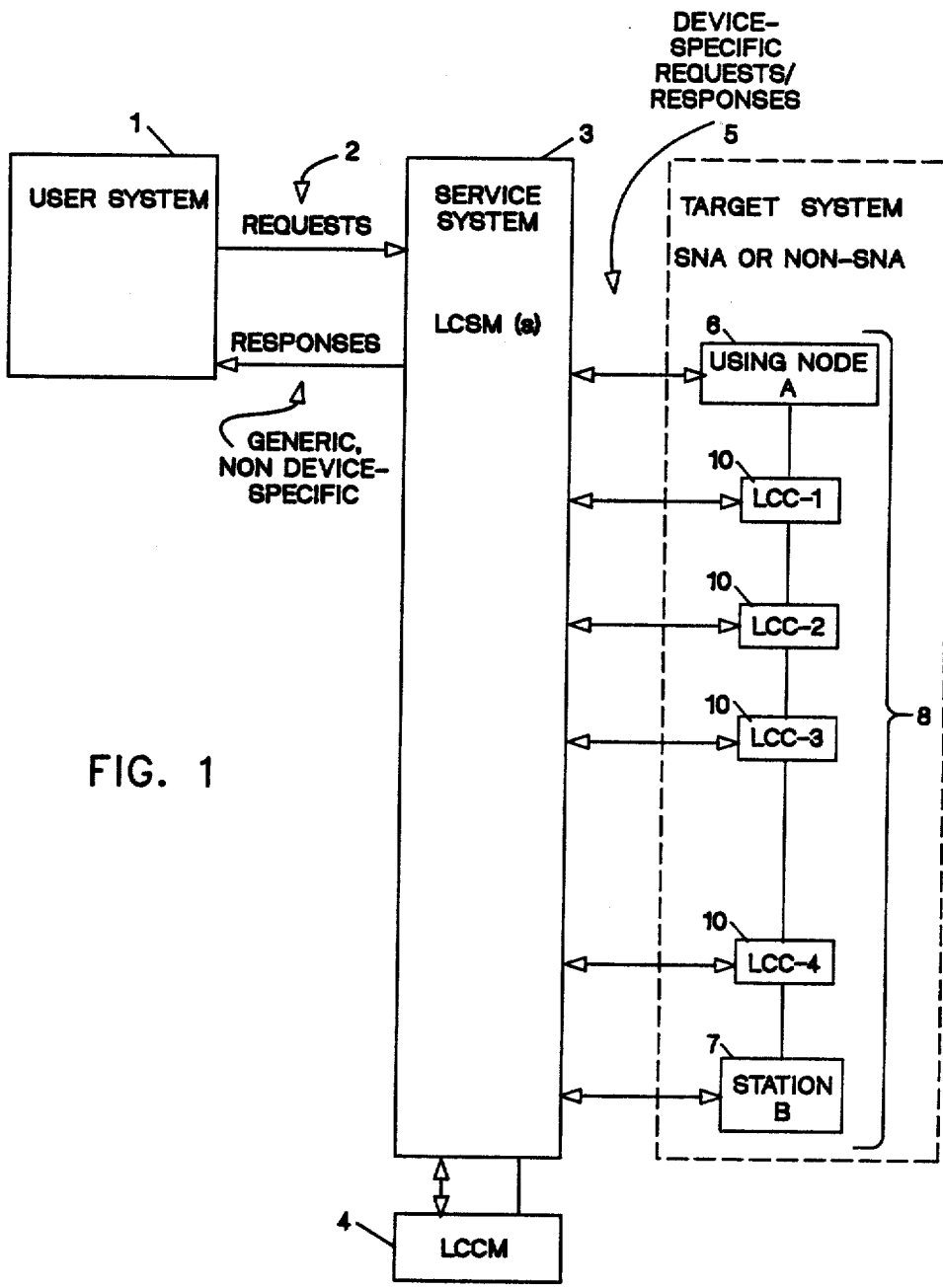
FIG. 1 illustrates a schematic data communication system or network constructed in accordance with the present invention as a preferred embodiment thereof.

The invention is conceptually and schematically illustrated in FIG. 1.

By way of introduction to some unique terminology and to provide an understanding of the basic concepts of the invention as applied to this system, FIG. 1 illustrates a user system 1. The user system 1 is the communication system operator or application program which is the source of generic problem determination and control requests. The generic requests are issued as non-device-specific inquiries or requests over a communication path 2 that could be a tightly coupled on-site cable link between the control console or an internal link between the control program and an intermediate service system 3 or it could be a communications link to a remote service system. The interconnecting link is shown generally as 2 and carries generic, non-device-specific inquiries or requests and resulting responses from the service system 3.

Service system 3 provides an intermediate control and translation facility and will generally be in the form of a program which is executed to provide specific diagnostic processes as will be described in greater detail later. The service system is associated with a physical network configuration data file or manager that contains, in effect, a network configuration map. This is shown as block 4. Block 4 contains the associated particular device data indicating the physical connections making up various links under the purview of the serice system 3, the specific physical device identities, capabilities for diagnoses, communication protocols and formats and the like. This information is used by the service system 3 to generate device-specific requests and inquiries into the communication network shown as various logical link 5 in FIG. 1. These are generally addressed, device-specific commands that are generated and sent to diagnose the condition of a given physical communication link by diagnosing its component parts in serial fashion from the end nearest the service system 3. A particular using node A is identified as numeral 6 within the overall communications link 8 which links the using node 6 with a target station 7. Overall, the node 6, the station 7 and the interconnecting communication link may be comprised of many components and constitute a "target system" for which problem diagnosis and control is desired in the context of the present invention.

Specific names have been given to the user system, service system and target system in the context in this invention. The architectural design of the preferred embodiment of the invention as shown in FIG. 1 has components that will now be identified in greater detail. The service system is constituted by a Link Connection Subsystem Manager hereinafter LCSM. The LCSM 3 in FIG. 1 has access to configuration data obtained and managed by another program or facility in files of information identified as the Link Connection Configuration Manager (hereinafter LCCM). The physical link connection components linking a using node 6 to a target node 7 and which make up the communications link 8 between the two are known as Link Connection Components (hereinafter LCCs).

FIG. 1 illustrates the basic scheme, architectural design and logical flow of the preferred embodiment of the invention. In general, the user system, i.e., the host system control operator or control program needs to be able to send diagnostic requests to and receive responses from the communications facility to get information about the logical link connections 8 without having to "understand" what the specific physical link connection components may be, what their inter-connection paths may be, or what their various requirements, capabilities and protocols may be.

In the invention, the service system, the LCSM 3, receives generic problem determination or control requests from the user system 1. In response, it accesses the configuraiton data base to determine the present physical configuration of the specific link to the target system node or station for which problem determination has been requested. The service system, the LCSM 3, does this by a generic request to the LCCM 4. The service system then is armed with a device-specific data and the physical network configuration and interconnection identifications that show the physical components making up a given communications link. LCSM 3 is then enabled to issue device-specific commands in series to the LCCs making up the given link for which problem determination is required. The LCSM 3 generates appropriate device-specific diagnostic and control commands to be sent to the physical target system devices serially to analyze their condition and to analyze the data responses returned from the LCCs. In response to any device-specific replies, the LCSM 3 generates either additional inquiries and/or, finally, generates the response to the user system 1 in the form of a generic non-device-specific problem determination message.

As alluded to earlier, target system link connections may be made up of multiple layers, herein called link subsystems, comprising various types of physical devices, device capabilities, and communication protocols all of which are usually provided by diverse vendors. As information and data communication networks of the type shown in FIG. 1 are constructed by users, they generally grow to support multiple protocols including IBM system standard SNA and non-SNA protocols. These systems usually contain multiple logical networks and may incorporate one or more physical networks. The data communications networks so constructed not only provide for the transportation of data in the normal systems today, but they may also include analog or voice information which has been suitably digitized for communications and control purposes. These factors all compound the problem of diagnosis for any specific problem isolation in the network, and particularly for isolating faulty components in a given link.

The invention describes an architectural structure and system method of operation that allows support of both SNA and non-SNA hierarchically nested or peer connected networks. The architectural structure design allows functions such as the service system function, the user system function or the target system function to be interconnected, distributed throughout the network in various components and/or nested in layered interconnections. The specific choice of placement for a given function within the structure is dependent upon the level of support, i.e., problem detection analysis or determination, that is to be implemented. The invention provides a consistent view of the link connection subsystems that allows effective problem determination and link fault recovery processes to be performed by the operator or control program for individual link components without the control program or operator being required to know what the specific link components or their characteristics actually are.

As noted above, the major problem with user constructed systems is that of providing effective problem determination in multi-layer, multi-vendor, multi-protocol communication networks. The end user usually is the first person to notice that there is a problem somewhere in the network, but the user usually waits for a period of time before calling the network operator for assistance. The reaction times of the end user and of the system operator account for a large part of lost system availability. Once it has been determined that a problem does exist, then some form of problem determination procedure must be performed in order to determine which physical device is at fault and what physical device recovery procedure should be employed to provide the fastest restoration of service to the end user. In the simplest form, this may be merely a matter of discovering which device is faulty so that it may be replaced or so that its particular vendor may be called for service. In the present day environment, these procedures are manually performed and may be disruptive to the communications link not only to the end user but to any intermediate system components.

The problem grows even more complex as communication network users migrate from separate physical network for voice and data into integrated physical networks for handling both voice and data. The problem grows significantly more complex as users also add higher functional components such as Time Division Multiplexers, Statistical Multiplexers, Protocol Converters, Front End Line Switches and the like. These diverse physical components create their own complex sources of problems and compound the difficulty of isolating a fault within the communications link in which they are used. They also create additional layers of complexity in the network. Such physical devices and the resulting complex communications link may provide many misleading conclusions if the specific idiosyncracies of the various devices present in a given physical link are not taken into consideration during analysis of the falling conditions. In the architectural system shown in FIG. 1, the LCSM 3 implements a diagnostic process that allows support of SNA and non-SNA hierarchical and peer connected networks. It allows functions to be distributed and/or nested within the network itself and permits programs or system operators to access link subsystem physical data for performing problem determination and/or to effect operational changes. Each subsystem has its own LCSM 3 responsible for the subsystem's unique problem determination and probable cause analyses for the physical devices constituting the subsystem. The knowledge of what the physical link configuration comprises gives to the LCSM-3 the ability to send diagnostic or control requests to other subsystem managers and also provides the operators access to all of the components in the link connection.

Management of the link connection requires its own hierarchical structure for commands and data flow. This structure is shown conceptually in FIG. 2. The physical link connection components 10 are the LCCs, LCC-1 through LCC-4, shown in FIG. 2. Together, LCCs form physical link segments 9 between each LCC and the next LCC, node or station. The segments 9 provide the overall physical link 8 connection between a using node 6 and a target station 7. The logical SNA view of the link 8 does not always reflect the fact that physical and hierarchical structural changes may occur or that various physical devices actually exist to make up the physical link segments 9.

Figure 2:
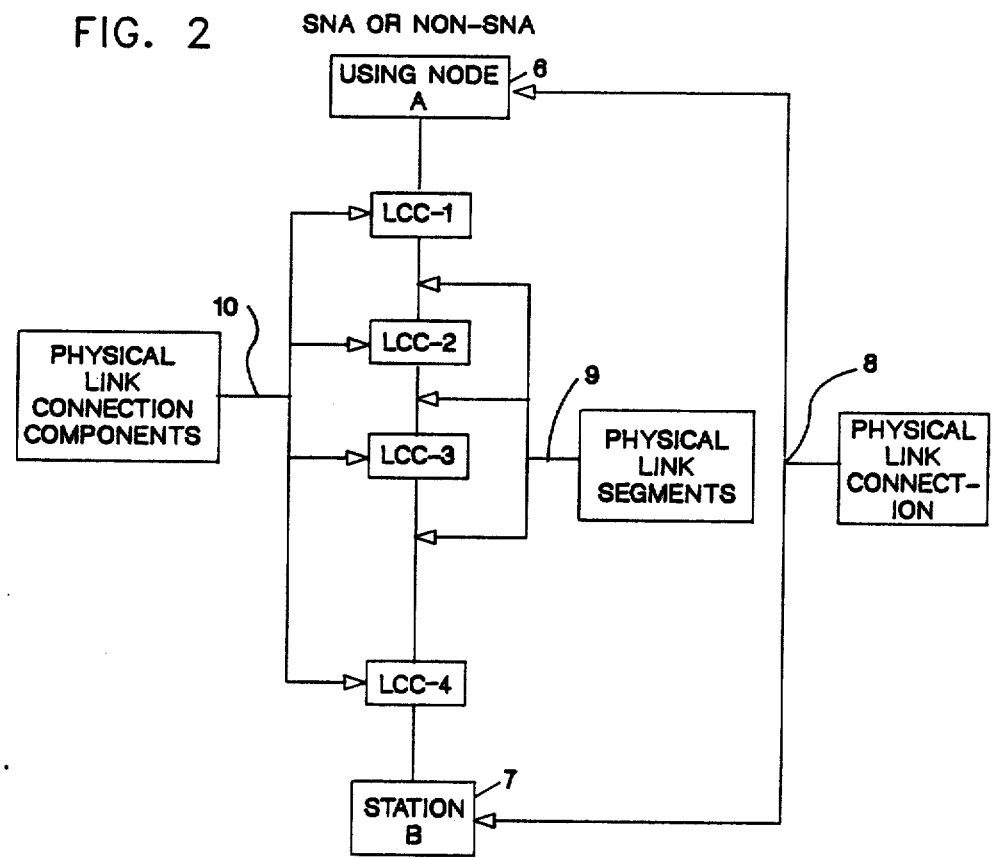
FIG. 2 illustrates the conceptual definition of physical link connections and physical link connection segments as components linking a using node to a target node or station.

The logical structure utilized in the invention is shown in FIG. 2. The actual physical link 8 is the connection of components that a user has assembled forming the logical link between two stations 6 and 7. In FIG. 2, the using node A and station B could be SNA or non-SNA nodes. Both node A and station B contain a station that wishes to communicate to the other through the link connection 8. The link connection 8 is composed of some arbitrary number of physical connection components. Each of the physical components 10 is referred to as a Link Connection Component LCC. Each LCC receives signals on its physical interconnection to the link and then passes them to another LCC or eventually to a node. The LCC is the smallest addressable element in the link connection 8. It can sometimes be addressed through a data link protocol of general usage or may require a specialized format. The addressability allows the subsystem manager LCSM 3 in FIG. 1 to address each LCC 10 using the correct protocol and physical capabilities that it has learned from the data stored in the LCCM 4. The LCSM may then send requests for data to specific LCCs 10 in a format or protocol understandable to them. It can then receive the responses from the LCCs 10 and interpret them.

The communication path segment connecting two LCCs 10 is identified as a link segment 9 in FIG. 2. Each link segment 9 is a portion of a communication path that may include copper wire, coaxial cable, optical fiber, microwave links or other satellite or radio communication components. In addition, a link segment 9 may contain even other LCCs 10 and other link segments 9. The definition thus given is generic. For example, in FIG. 2 there is a link segment between LCC-1 and LCC-3 that contains two smaller segments interconnecting LCC-1 to LCC-2 and LCC-2 to LCC-3. Each LCC reports to an assigned link connection subsystem manager, LCSM 3. An LCSM 3 is thus responsible for one or more specific LCCs and therefore is in control of the link segments therebetween. An LCSM 3 may address its assigned collection of link connection components 10 and is responsible for the management of the components themselves. The collection of components addressed by an LCSM 3 is referred to as the link subsystem for logical analysis.

A detailed description of a preferred embodiment together with the steps utilized in the method of operation of preferred embodiment will now be given together with detailed descriptions of the various processes employed and an identification of which devices within the physical network they are employed. The functions performed by each process in the link connection that services the operation of the link and which aid in link problem determination and eventual recovery will be described now.

The specific components that are described include the nodes A and B which use the link, each of the LCCs 10 that make up the link interconnections, the LCSM 3 and the LCCM 4.

A typical using node 6 as shown in FIG. 1 may be a communications controller or a communications system having an integrated communications adapter. Either type of device incorporates program controlled self-diagnostic capabilities for determining whether the node itself is the cause of a problem or whether the problem is in the communications link attached to it. A node 6 is assigned the responsibility for detecting link connection problems. This is usually accomplished by inference from the node 6's inability to send or receive or by the detection of an extensive number of retransmissions being required on that link. The using node 6 has two functions to perform in the event a problem is detected. First, node 6 must perform an elementary probable cause analysis of each problem to determine whether the problem is due to a failure in the node itself or whether it lies in the link connection. When a failure is discovered within the node itself, then the node runs its own internal diagnostic routines to isolate the problem for reporting. An improperly functioning communications adapter, i.e., a line driver, internal modem or the like, might be found in such a test. When the problem is not within the node 6 itself, it is assumed to lie somewhere within the link connection components attached to the node. The node then reports this link connection failure to the link connection subsystem manager, LCSM 3. Systems and devices of this type that comprise a using node 6 as just discussed are in common usage today. An IBM 3725 communications controller is a typical example of a system that is capable of diagnosing faults in itself and/or of identifying the fact that the fault is not within iteself but lies within the communication link connection. These devices have the capability of reporting an error condition to an LCSM 3 together with any associated data that is normally maintained such as traffic counts, error counts and adapter interface status conditions that may be reported.

It is the responsibility of the LCSM when notified of a problem by a node 6, to learn what the communications link connection configuration is for a given communications link between node 6 and node 7 such as in FIG. 1. This information will be obtained from the LCCM 4 as will be described later.

The LCSM 3 is responsible for managing its assigned link subsystems for a given link connection or set of link connections. LCSM 3 receives notification of potential problems from using nodes such as node 6 in FIG. 1. It receives any unique data from the link LCCs 10 that may be forwarded to it by the node 6. The LCSM 3 is the component in the system that must send commands eventually to the LCCs 10 and which receives their responses. The LCSM obtains from the LCCM 4 the present connection configuration identifying the elements in the given communication link together with the addresses of the individual LCCs 10 with which it will communicate. The LCSM does not contain the configuration map of the entire link connection.

The LCSM receives commands or inquiries from and responds to requests for tests to be performed from the user system or operator 1 in the form of generic requests 2 as shown in FIG. 1. The requests from the operator 1 will be directed to a given LCSM in response to indication of a problem being reported from a given node 6 which will be relayed to the operator and displayed on a screen. The operator will determine which LCSM 3 has been assigned the management function for determining problems within the identified links connected to the node 6. The operator will issue a generic problem determination request to the LCSM 3 that is assigned to managing a given communications link and will identify the target node 7 for problem determination.

The LCSM 3, in response to these generic requests, will query the LCCM 4 tp determine the communications link configurations and addresses of devices constituting the link. It will also determine what the appropriate protocol or communication method is for each identified specific LCC 10. The LCSM 3 will then generate a sequential series of inquiries to implement testing of the communications link between nodes 6 and 7 by serially issuing diagnostic commands to the individual LCCs 10 in turn. It will eventually report either that a failure has been detected and isolated to a specific LCC 10 or that a failure has been detected or has not been isolated to a specific component or that no trouble has indeed been found.

The LCSM 3 will return a response to the operator or using system 1 in the form of a generic response that has been translated from the device specific responses received from the LCCs 10. It may indicate that a particular problem has been isolated by a performed probable cause analysis routine which isolates the error condition to a specific LCC 10 or to a connection to a specific component within its sphere of knowledge. The report to the operator or system management program may be employed for further analysis or possible rerouting of traffic to bypass a failed element. The information may be used directly by the operator or may possibly be routed to a higher network management application program for further analysis. Because of its limited capabilities, the LCSM 3 is not expected to determine the probable causes of error for the entire link connection that may exist but only for its own assigned LCCS 10. Other LCSMs may be involved in determining probable cause error conditions for still other LCCs in a given communications link between two nodes and the user system or host operator 1 must be able to send requests for tests to multiple LCSMs 3 in such a system configuration in order to determine fully what problem is occurring and which element is responsible.

The LCCs 10 typically may be protocol converters, computerized branch exchanges, time division multiplexers, modems, statistical multiplexers, front end line switches, local area network controllers and the like. Each link connection component 10 will perform specific functions that it is capable of carrying out at the physical link layer that it represents. These functions, which in turn give rise to the customary names of the LCCs themselves, include: digital to analog signal conversion, typically performed by modems; line multiplexing, normally performed by multiplexors or some switching systems; and other functions that effect the physical data transmission layer. Each LCC 10 monitors its own operational condition for its own link segment. At the occurrence of failures, the LCC 10 affected may initiate various tests to determine the causes of failure or it may merely record them for later analysis by another entity. A given LCC 10 may, if it is so enabled by its construction, attempt a recovery action when a problem is detected by initiating internal self-tests and/or by notifying its neighbors of a problem. It may participate with its neighbors in problem determination procedures which may include performing wrap tests or line analysis tests such as those carried out typically by some "intelligent" modems. Each LCC 10 must be able to execute and respond to diagnostic commands received from its assigned managing LCSM 3. The commands may cause functions to be performed such as self-testing, status checking at interfaces, and collection of various operating parameter settings for the individual devices. The specific commands that may be received from the LCSM 3 will, of course, necessarily be in the proper format and/or protocol required by the LCC 10. Since various LCCs have differing capabilities and may implement different command functions and responses, the physical configuration of the individual links between nodes served by a given LCSM 3 are maintained in the LCCM 4.

An effective physical "map" of a given communications subsystem has a set of links and link segments, together with identification of each of the LCCs making up the link, the unique characteristics and requirements of each of the LCCs, their addresses, and their diagnostic capabilities. All this data may be entered manually into files of data maintained by the LCCM 4 for later retrieval and response to inquiries.

An example of how the LCCM 4 can gather dynamic configuration data is the IBM 3174 controller using the Network Asset Management function. The IBM 3174 Network Asset Management works as follows. When a device attached to the 3174 powers-on, it automatically passes machine type, model and serial number to the 3174. This allows the 3174 to determine the type of device that is attached to it and to physically identify the device with a unique serial number. The 3174 maintains this data with information that identifies the port to which the device is attached and an indication that the device is currently powered-on. The LCCM 4 can request this data from the 3174 and log it in the LCCM's data base. This allows the LCCM to automatically gather dynamic configuration data without requiring the user to manually enter this information into the data base. This example has shown that this feature allows the LCCM 4 to identify, for example, the 3174-A has port #3 connected to 3194-B display and that the display is currently powered on.

Some of the LCCs 10 may be able to dynamically establish connections within the link when they are activated. Front end line switches, computerized branch exchanges and some local area network controllers have this capability. This means that the physical communication path for a given link segment may not be predetermined and stored in the data base in a given LCCM 4. The LCCM 4 will provide an indicator that this is the type of link segment or link employed since it will have an indicator that either static, i.e., fixed or dynamic, i.e., readily changeable connections may be performed by a given LCC 10. This allows the LCSM 3 to request the specific LCC to determine their current connections for each link segment. The LCCM 4 merely informs the LCSM 3 that a dynamic link exists, the LCC must be queried to determine what the actual connection is at the present time.

Summarizing the operation of the overall system design just discussed, it may be seen that the structure as described in FIG. 1 exists conceptually for each link connection. At a system level, however, the LCSM 3 incorporates processes that enable the LCSM to handle problem determination for all segments of all the link connections incorporated within a link subsystem or target subsystem between a using node 6 and a station 7 as shown in FIG. 1. This type of design allows the LCSMs 3 to be developed to support any type of communications protocol or command environment and either SNA and non-SNA link connection components may thus be easily accommodated. The information that flows between the LCSM 3 and the LCCM 4 is designed to provide a generic support capability that allows any type of product LCC 10 to be supported. Any product unique commands, protocols or requirements are generated by the LCSM 3 in response to the information it receives regarding the physical configuration of the link from the LCCM 4. All of the necessary problem isolation and determination analysis processes, i.e., a sequential series of analyses performed on each LCC 10 in turn, until the problem is isolated and identified, will be issued by and responded to and the responses analyzed by the LCSMs 3 in coordination with the LCCs 10.

Each of the LCCs 10 must be addressable from its corresponding LCSM 3 in order to received commands, execute tests, gather data or transmit information. The way in which this accomplished depends upon many factors including the location of the LCSM 3 relative to the given LCC 10 in the network, the type of communication path available for communication, and the type of data link control protocol that is utilized. The many differences in the communication factors mentioned for each LCSM 3 make it unlikely that a single addressing structure for all LCCs 10 may be implemented. However, within the link connection subsystem which exists for a given target system between nodes 6 and 7, there should be a consistent means of presenting for the operator the condition of all the LCCs that make up the link. This is accomplished by the invention which is capable of displaying to the operator the present physical connections making up the link together with generic responses identifying which element or elements have been isolated as being the source of a problem.

The system operator 1 or an automated diagnostic program running in a host, is the request control node which is able to issue a single diagnostic link problem determination command in a generic form to an appropriate LCSM 3 and to await a generic response from the LCSM 3 without ever having to be aware of what the actual link components 10 are, what they require in terms of communication specific commands, device commands, what capabilities they have or what responses they may provide. The LCSM 3 that is assigned to managing the link will obtain this information from the data files in the LCCM 4 and use it to translate the given LCC requirements and responses into an appropriate generic response. The LCSM also uses the LCCM 4 to translate resource names identifying node A and station B into identified target links 8 comprising the link segments 9 such as shown in FIG. 2.

Thus, from a mere report of a problem existing at a given node such as 6 in FIG. 1, the LCSM 3 will relay the problem notification to the using host operator 1 who will determine which LCSM 3 has the task of managing the physical configuration and has the capability to diagnose a given target subsystem. With this information, the host operator control program can issue a generic command to do a link problem diagnosis on a given target node.

The LCSM 3, receiving such a generic request, has access to its attached LCCM 4 to determine from the node resource names identified in the generic request what the actual identified target link 8 must be and what the devices within it are in a given configuration. It is also capable of discovering what the specific LCC 10 identifications are, what their capabilities are and what their addresses are within the system so that it may perform appropriate diagnostic processes upon them. After performing the diagnostic tests, the LCSM 3 can generate an appropriate generic response indicating the nature of the problem or identifying the source of the problem back over the generic interface 2 to the user or managing program 1.

EXAMPLES OF OPERATION OF THE PREFERRED EMBODIMENT

Figure 3:
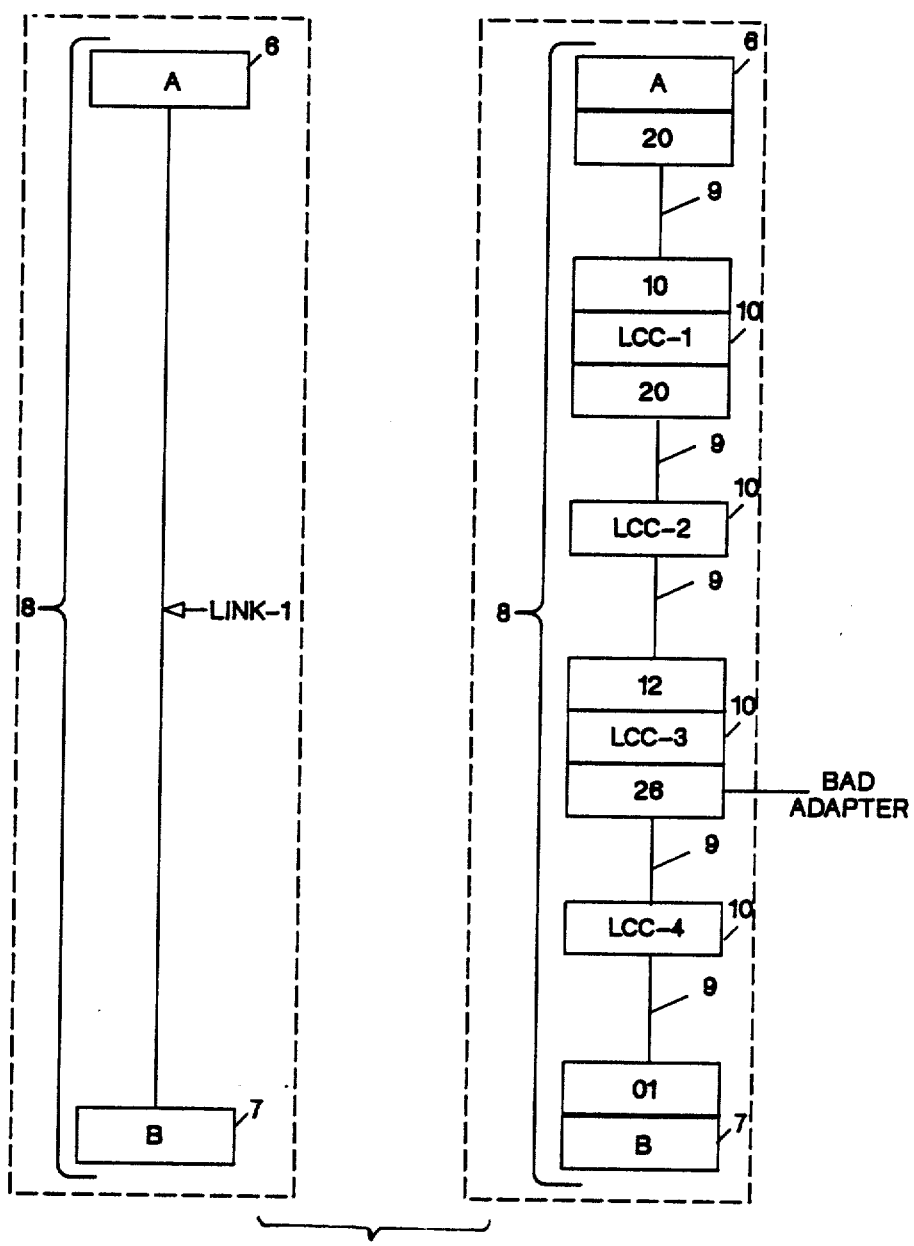
FIG. 3 illustrates schematically the logical conception of a communications link together with the physical reality of a specific communications link in its conceptual form.

This section will describe how the LCSM operates as a service system in the context of the preferred embodiment of the invention for converting generic problem determination requests into appropriate commands to be sent to the target system. How it receives any data returned from the target system and analyzes the results and generates a generic response back to the user 1 will also be described. Prior to giving the example, the implementation will be discussed in terms of the logical and the physical link connections that are shown in FIG. 3. The logical view as shown in FIG. 3 is what the user, i.e., system operator or control program 1 knows about the logical connections in the system. All it knows is that station A or "node A" is connected via a link, "link 1" in this example, to an eventual terminal or station, "node B". In addition, it will know that link 1 is managed by a given LCSM.

The physical view, which is reconstructed eventually by the LCSM 3 using data from the LCCM 4's data files and dynamic data from the LCC 10, identifies all of the link connection components together with what ports or connection points or terminals are used in making up the actual physical connections between node A and node B. It will be noted that there are six elements comprising nodes A and B and all of the intermediate LCC devices as shown in FIG. 3. The physical view shown in FIG. 3 only indicates that the adapters that exist are part of the link connection. In reality, node A, LCC-1, LCC-3 and node B may actually have multiple adapters that would be used in other link connections that are not shown since they form links to other nodes which are not in question. In the example shown in FIG. 3, the physical network is assumed to have a bad adapter at port 26 in LCC-3 that will have to be discovered and diagnosed by the LCSM 3 (not shown). The failure of an adpater such as at port 26 in LCC-3 would prevent activation or receipt of communication from node B in the physical and logical views shown in FIG. 3.

Problem determination in this example begins as shown schematically in FIG. 4. FIG. 4 constitutes both a process flow chart and a schematic of the communication process. It is broken down into three horizontal frames or fields of information for the overall flow of the process. The user system, or operator 1 as designated in FIG. 1, is the request control node which initially communicates in generic request form to the service system 3 operating as an intermediate translation and control facility as designated originally in FIG. 1. Service system 3, as intermediate translation and control facility, issues device-specific requests and receives responses over an interface 5 connected to the target system comprising the links from node 6 to node 7.

The arrows in FIG. 4 show the direction of flow of inquiries and responses. Grouped in vertical columns beneath the user system 1, service system 3 and target system comprising the components from 6 to 7, are the various requests or responses, in the time sequence in which they are created in either non-device-specific, i.e., generic protocol or in device-specific protocol, i.e., particular protocol and device dependent format, as appropriate.

Figure 4A:
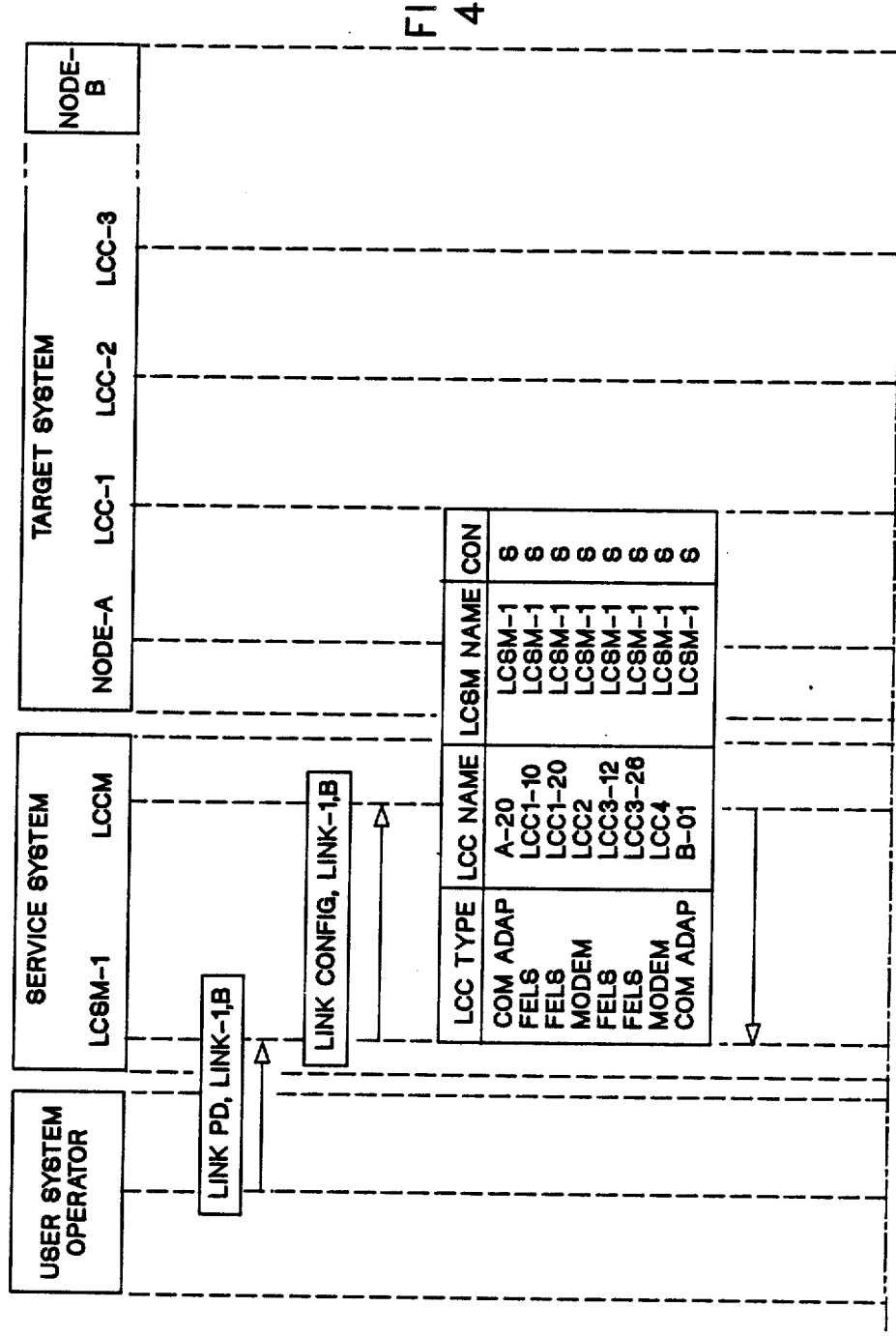

In the example now being a given, it will be assumed that a user at station B in FIG. 3 calls a help desk at the user system operator 1 over a telephone line (not shown) to complain that logon to the system, for example, cannot be achieved. The help desk operator at user system 1 determines that the station B is not active by examining the network status for station B, available to the operator. After determining that there has been no notification earlier about this failure, the operator may use the LCSM 3 to display the logical paths to station B. This will indicate to the operator that station B is attached to link-1 and that LCSM-1 is the assigned manager for that link, i.e., subsystem. Then, the operator sends the first generic command as shown in FIG. 4A, "Link PD, Link-1, B". This indicates that LCSM-1 should conduct a link problem determination probable cause analysis for the link-1 to station B. The LCSM 3 receives this request as shown in FIG. 4A and sends a corresponding request to its LCCM 4 as shown in FIG. 1. It asks for the configuration of link-1 to station B. By this, the LCSM 3 intends to determine what the physical communication interconnection configuration is between node A and station B.

The LCCM will respond with the inforamtion shown in FIG. 4A describing the physical connections illustrated previously in FIG. 3 for all of the LCCs 10 existing between node A and station B. Each LCC 10 will be identified by type which will indicate to the LCSM what kind of commands will be appropriate for each unique LCC, what protocol should be employed and what possible responses may be received. The LCC name is also given. This allows the LCSM to send the unique commands to the correct LCC and indicates to the LCC which ports or adapters, if any, should be checked. This information from the LCCM also shows the LCSM name that identifies the LCSM responsible for the management of the given LCCs in the link. It also yields an indication of whether a given communication physical device LCC happens to have static "S" or dynamic "D" connections as shown in FIG. 4A.

In the example now being discussed, the LCSM-1 is responsible for all of the LCCs in this assumed link between a communication adapter A and communication adapter B. Interconnections forming the link segments are given under the LCC name information and it shows that port 20 of communication adapter A, which is part of node A, is connected to port 10 of a front end line switch whose output port 20 is connected to a modem LCC-2 whose output is connected to port 12 of another front end line switch whose output port 26 is connected to modem LCC-4 which is connected to the communication adapter which is part of station B. All of the connections are static in this assumed example and this is indicated in FIG. 4A. The LCSM-1 is responsible for managing all of the link segments as indicated. This is all in response to the link configuration command generated by the service system 3 to the LCCM. The response contains the information shown in FIG. 4A and is returned, as the arrow shows, back in the direction of the LCSM-1.

With the physical link connection components now identified and known to the LCSM and the identity of the managing LCSMs if more than one are required, being known, the LCSMs can begin to issue appropriate commands to determine if a problem can be identified or isolated on this link. The LCSM-1 begins the process at the controlling end of the link, i.e., that end of the serial connection of devices constituting the link that is nearest to the operator in the physical structure of the link. The devices are listed sequentially for the assumed configurations as shown in the figures, which reflect the same order of connections that the physical devices exhibit. As shown in FIG. 4B, the first command issued by the LCSM 1 is a query status command issued to the node A, port 20, or simply adapter 20. The response, as shown in FIG. 4B, indicates that the adapter 20 is active but there has been no response from station B. This confirms that there is indeed a problem in the link but the response does not identify the cause of the failure.

Next, the LCSM 1 will issue a display connection command to the front end line switch, LCC-1, to determine the status of the connection between its port 10 and port 20. The response as shown in FIG. 4B, indicates that the connection is active and that no failures have been detected by LCC-1.

The next component in the physical link between node A and node B is LCC-2 which happens to be a modem. The LCSM then issues a modem self-test command in appropriate format for LCC-2 to respond. The response from LCC 2 indicates that the self-test as commanded has been passed successfully and there are no failures detected by the LCC-2.

Next, the LCCM issues a display connection command to the LCC-3 which is a front end line switch and inquires as to the status of the connection between a port adapter 12 and port adapter 26, or simply, or port 12 and port 26. The response indicates that the connection is inactive and that a failure with adapter 26 has been detected by the LCC-3.

There is no need for the LCSM-1 to continue testing further, because a problem has at last been identified by the LCC-3 and port adapter 26. The LCSM 3 will send a reply in a generic form back to the operator that identifies LCC-3, port adapter 26 as the failing component on link 1 to station B. The generic form of the response is as shown in FIG. 4C. The response also includes the hierarchy in the physical link interconnection which allows the operator to understand how the components are connected.

The first example discussed above assumes a single LCSM and that intermediate connections of the LCCs which it manages are all static ones. A second example will now be given in which there are both static and dynamic connections involved in the subsystem served in a given LCSM.

Figure 5A:
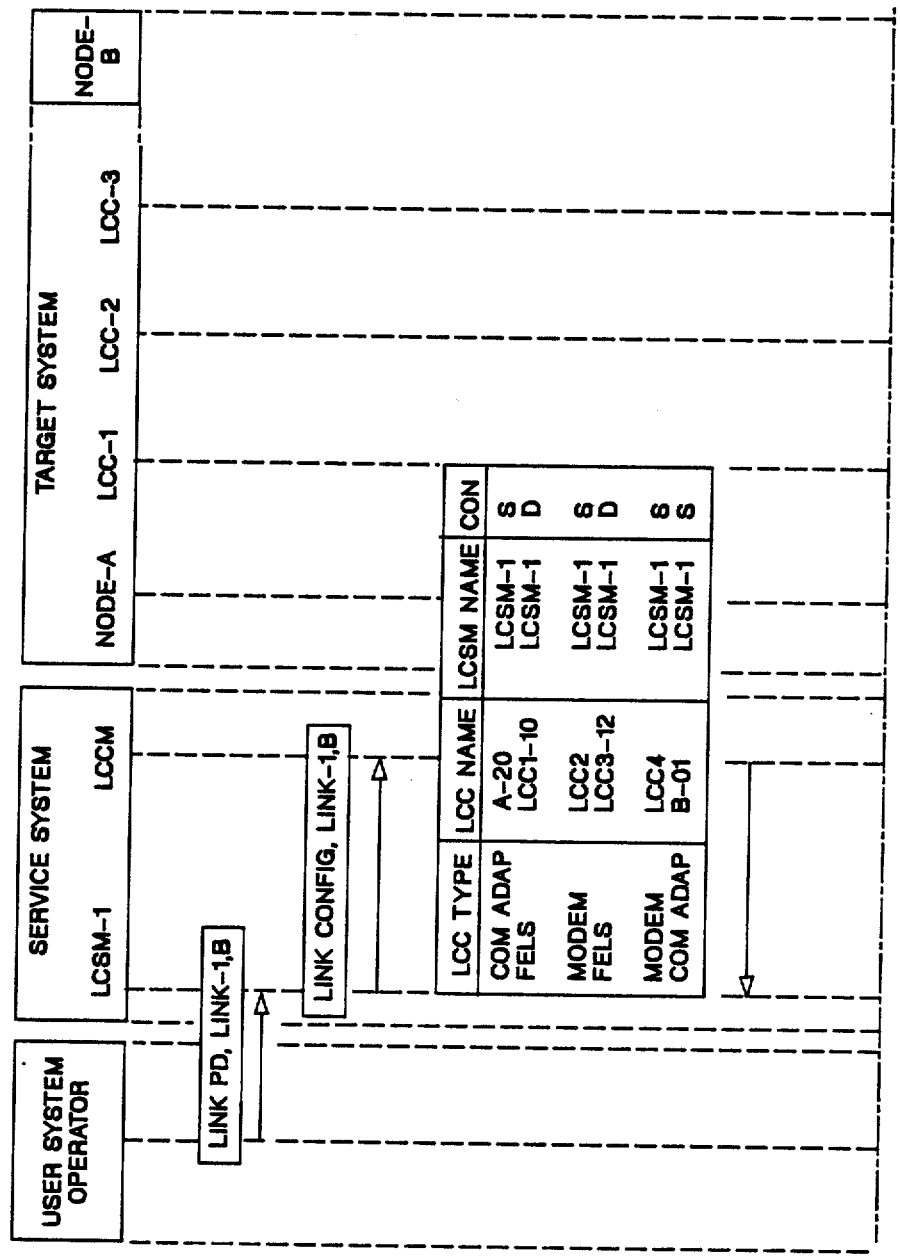
Figure 5C:
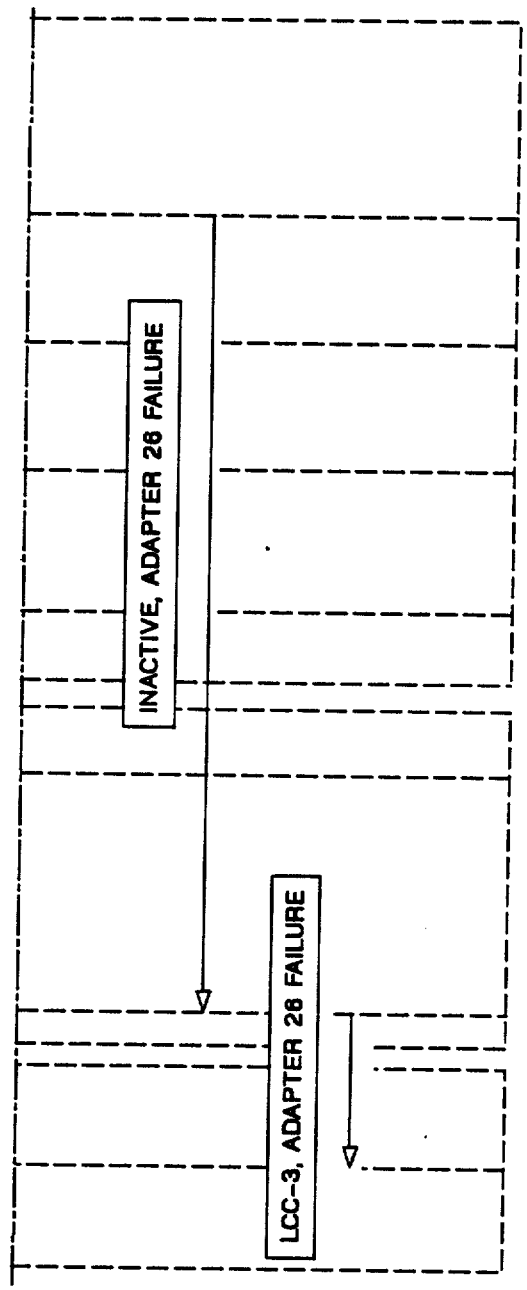
Figure 5:
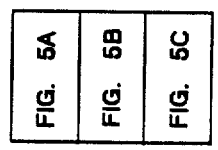
FIG. 5 is a schematic layout showing how

The process is the same as that previously given down to the point where the physical link connection components have been identified and the LCSM can start issuing the appropriate commands to determine if the problem can be identified and/or isolated on the link. FIG. 5A shows the response from the LCCM in response to the link configuration request, "LINK CONFIG, LINK-1, B" given by the LCSM-1 to the LCCM.

In FIG. 5A, the first component identified by the LCCM in the link is the communications adapter, so LCSM-1 issues a communication adapter query status command to determine the status of adapter 20. This is the same type of command for status inquiry as previously discussed with relationship to FIG. 4B. A response in this case indicates that the adapter is active but there is no response from station B. This confirms that there is a problem, as was the case with the example previously given, but does not identify the causes of failure.

Next, LCSM-1 will issue a display connection command to the front end line switch, LCC-1 to determine the status of the dynamic connection to which its adapter 10 is currently connected. The response will indicate that adapter 10 is connected to adapter 20 and that the connection is active and no failures have been detected by LCC-1. In the path as identified in the LCCM's response to the the LCSM, the next component in the path is LCC 2, which is a modem. The LCSM therefore issues a modem self-test command to the LCC 2 modem. The response from the modem indicates that the self-test was passed and no failures have been detected by the modem.

Next the LCSM will issue a display connection command to the second front end line switch, LCC-3, to determine the status of the dynamic connection to which adapter 12 is connected. The response will indicate that the connection is inactive, that it had been connected to adapter 26, and that a failure with adapter 26 has been detected by the LCC 3. At this point there is no need for the LCSM to continue testing; a problem has been identified by LCC-3 with adapter 26. The LCSM will send a reply to the original generic link problem determination command from the user that will identify LCC-3, adapter 26 as the failing component on link 1 to station B.

Next, an example using two LCSMs and both static and dynamic connections will be given. The basic problem determination procedure follows as with the previous two examples through the section where the LCSM has issued the link configuration request to the LCCM and has received the response indicating the present physical connections in the given link. In the example, FIG. 6A shows the configuration that is assumed to exist for this problem. The first component identified in this linkage is the communication adapter, so the LCSM-1 issues the communication adapter inquiry status command to determine the status of adapter 20. The response in this case indicates that the adapter is active but there has been no response from station B. This confirms that there is a problem but does not identify the cause of the failure.

Next, the LCSM 1 will issue a display connection command to the LCC-1 which is a front end line switch to determine the status of the dynamic connection that adapter 10 provides. The response will indicate that adapter 10 is connected to adapter 20 and that the connection is active and no failures have been detected by the LCC 1.

The next component in the path is LCC-2 which is a modem as previously indicated. This modem, however, is assigned to LCSM-2 for management purposes. Thus, LCSM-1 does not issue commands to the LCC-2 but instead, issues the generic request, link problem determination command to the LCSM-2 and indicates that the problem determination should be conducted for the LCC-2. LCSM-2 receives this generic request and sends a link configuration request to the LCCM which serves it to determine the physical configuration for the LCC-2. The LCCM serving the LCSM 2 will give a response that includes an indication of the current physical connections for LCC-2. This will indicate that it is a modem and that there are no other LCCs that need to be tested. With the physical identification of LCC-2 completed, the LCSM-2 can issue the modem self-test command to the LCC-2 as LCSM-1 would have had it been assigned the task of managing LCC-22. The response from LCC-2 indicates the self-test is passed and there are no failures detected. LCSM-2 will then send a reply in a generic format back to the LCSM-1 that indicates that no failure was detected.

Next, the LCSM-1 will issue a display connection command to the LCC-3 which is within its control to determine the status of the dynamic connection to which adapter 12 is connected. The reponse will indicate that the connection is inactive but that it was connected to adapter 26 and that a failure with adapter 26 has been detected by LCC-3. The example concludes at this point since there is no need for the LCSM to continue testing. The problem has been identified with LCC 3 adapter 26.

In the example just given, the LCSM implementations shows that one or more LCSMs might be assigned "ownership" of the various LCCs in the target system. In reality, this is often the case and, in fact, individual LCCs can be "owned" by many different LCSMs and the LCSMs themselves may be interconnected in a layered structure or horizontally in eqaul priority as peer connected. Nested, or layer-connected LCSMs provide a system in which the user may only know that one LCSM actually is on a link. The user would send the generic requests to that LCSM to perform link problem determinations. The LCSM-1 would make a request to its subservient nested LCSMs of which it would be aware but which the user would not know existed. If the individual LCC's characteristics finally identified from the configuration commands issued by the LCSM to the LCCM showed that various LCSMs were assigned to the physical link LCCs, then the LCSM-1 would use the generic commands to ask the subservient LCSM-2 or -3 to perform link problem determination routines and to send the results back to LCSM-1. This structure allows many components and/or LCSMs to be added to given links without requiring the user system 1 to be aware of the changes or even to require all LCSMs to be aware of the additional component so long as the highest nested LCSM has a LCCM that is aware of the changes.

Figure 7:
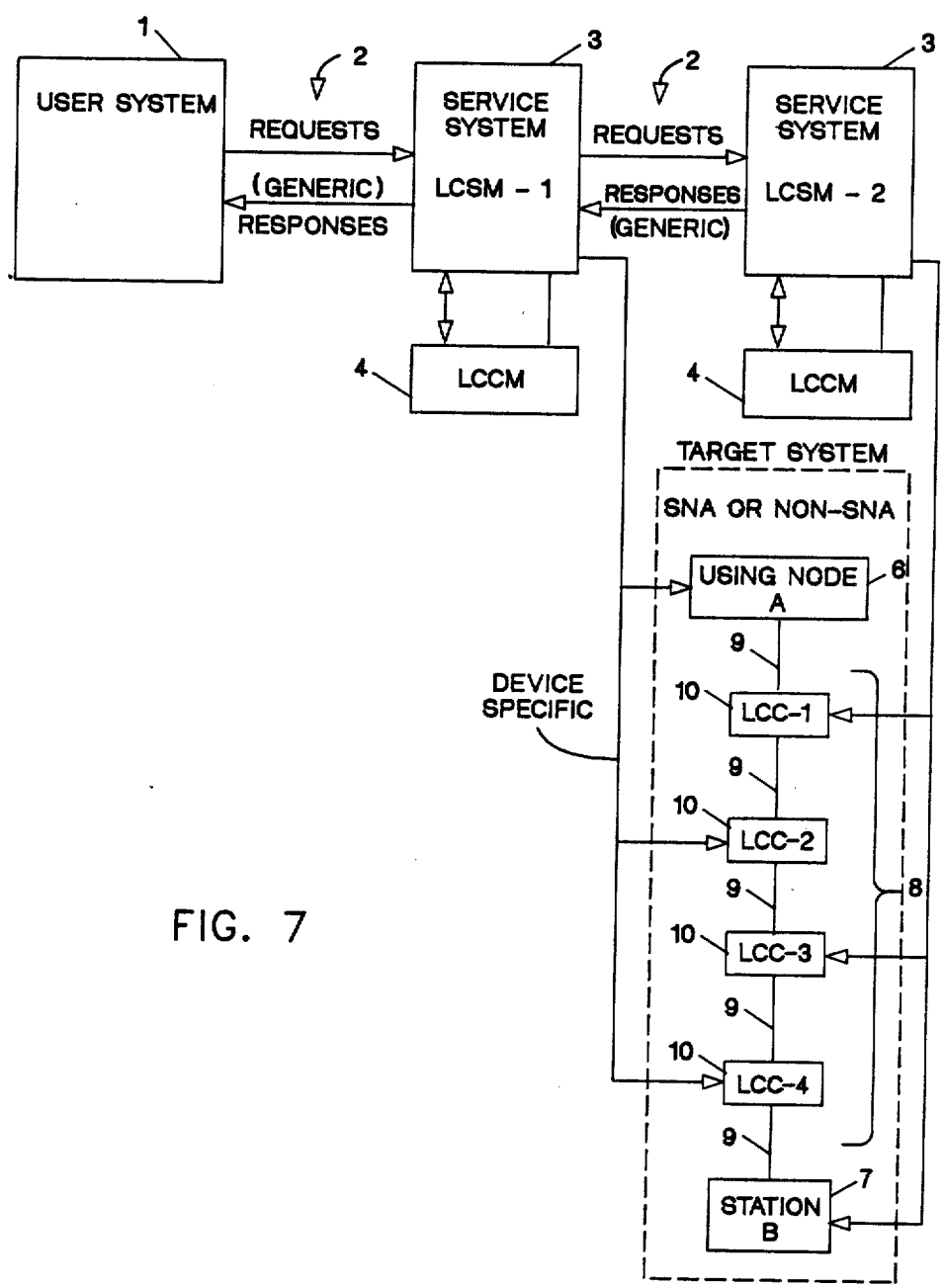
FIG. 7 illustrates an example of nested or layered multiple intermediate control and diagnostic facilities in a layered network.

FIG. 7 shows the concept of nested LCSMs which, from the user system, provide the appearance of a single LCSM-1, since the user will not be aware that any subservient LCSM-2 or any further LCSMs exist. User system 1 will thus send its link problem determination generic commands to the first LCSM, LCSM-1. LCSM-1 which is aware of the other LCSMs, following the receipt of information from its own generic link configuration request to its attached LCCM 4, will know that some of the LCCs are identified with a different LCSM name, for example the LCSM-2. LCSM-1 will therefore send appropriate commands for the affected LCCs to ask LCSM-2 to perform link problem determination in generic request format and to send the results in generic format back to the LCSM-1. This type of structure allows components and LCSMs to be added to the link without ever requiring user system 1 or even all of the LCSMs to be aware of the additional changes or components. In the example shown in FIG. 7, LCSM-1 is responsible for the using node A, LCC-2 and LCC-4. However, LCSM-2 is responsible for the LCC-1, LCC-3 and station B. Both LCSM-1 and -2 are necessary to manage the complete target system between node A and node B as shown.

Peer connected to LCSMs may be shown in the example illustrated in FIG. 8. In FIG. 8, two user systems 1 exist, although one may not be aware of the other. In addition, two service systems, LCSM-1 and LCSM-2, exist, although each user system may not be aware of the other subservient LCSM to which it is not directly connected. In short, when LCSMs are peer connected as in FIG. 8, there may be multiple user systems that are trying to do problem determination on the same target system. These user systems may not be aware of each other's existence or that there are multiple LCSMs involved with the link connection. The LCSMs in FIG. 8 will use generic commands to communicate between one another and would send the results to their respective user systems making the problem determination requests. Peer connnected LCSMs are shown with LCSM-1 being responsible for the using node A and LCC-1 while LCSM-2 is responsible for using node.B and the LCC-2. Again, two separate LCSMs are jointly responsible for the overall management of the target system link between node A and node B.

To issue commands, execute tests or gather data, the generic command structure between user systems 1 and the service systems 3 or between service systems 3 has been described above. The same structure is also used between LCSMs for communication or between the LCSM and their attached LCCMs as previously defined. FIG. 9 illustrates the generic command or reply format which permits uniform communication among users and LCSMs or between LCSMs and other LCSMs and LCCMs.

The format for communications begins with a header 11 followed by a unique command field 12 which is followed by a field 13 comprising one or more parameters identifying conditions associated with the given commands in field 12. Following are descriptions of some commands and their functions that have been designed to support the interchange between the user system 1 and the service system 3 or between separate service systems and other service systems of the LCCMs associated therewith.

First there is a "send message to operator" command. A message will be generated with a unique header that identifies a generic command message. The unique header is the same in all communications among sending and receiving generic message and command devices in the system. The function of this message, "message to operator", is to provide messages among system operators using the system. It is used as a means of communication between operators working on the same problem but who may be remote from one another. For example, an operator at a given user system 1 and another operator at a service system 3 may exchange messages in this fashion. The command includes as parameters after the specific send message command in the command field 12, a name list, a short message, a qualified message, message identifications, replacement text and user text messages. The types of messages would be identified in the field 13 by the parameters specified. Numerous other parameters for other types of messages may easily be envisioned, although only a few specific types of messages have been identified.

The same message format as shown in FIG. 9 may be used for a variety of commands, the unique generic command header in field 11 being the same in all cases, but the code point selected for the unique command in field 12 being arbitrarily established as user system management dictates.

Another command would be the run command and reply. This will initiate a request to execute a command by some target system manager. This command is used by the LCSMs to send product specific LCC commands to other LCSMs. The sender and receiver must understand how to support these non-generic command formats. This command provides a transportation envelope for passing new commands and reponses between operators and applications and allows the network operator a vehicle to issue requests for having commands executed by specific LCSMs. The commands to be issued by the LCSM in executing this command are the specific subsystem device-specific commands used to operate the subsystem under the control of a given LCSM. The response from an LCSM back to the system operator is the same format as the run command but includes in the parameter field 13 replies in the form of reply counts, procedure identifications, data sensing information, various messages and/or text.

The link problem determination command and reply format was alluded to in the several examples above. This command initiates the analysis of the status of the various LCCs managed by a specific LCSM. The command allows the problem determination to be performed on any link without having the operator understand the location of the link connection components or even to know what type of components are there or what commands they are capable of supporting. The reply uses the same format and includes specific identifications for: No failure detected; Failure isolated at LCC; Failure isolated at segment; Failure outside scope of this LCSM (upstream); Failure outside scope of LCSM within identified link segment; or Failure outside scope of LCSM on other side of link segment (downstream).

Another command is the link data command and reply command. It requests control data or, the statistics or any error data held by or stored for the various LCCs belonging to a specific target system.

Another command is the link test command and reply. This may be used to set the LCCs into test mode and request that the LCC's specific test results be reported. This command allows the testing by the operator of any link without having any understanding of the location of the link connection components or what type of devices exist there or what commands they support.

Yet another command that was referred to in the examples above is the link configuration command and reply. This is an inquiry from the LCSM to the link configuration connection manager, LCCM 4 in FIG. 1. It inquires as to what the component resources are and what their status may be at a given time. It allows the requester to determine the physical connections making up a link by identifying the LCC types, names and identify of the managing LCSMs therefor as well as to determine whether the connection is a static or dynamic one.

It may be observed that the overall structure as shown in FIG. 1 provides a system and method of communication and a process for problem isolation that provides an operator with the capability of requiring tests on physically specific link connection components without ever knowing what components exist or where they exist within the system since the determination can be conducted for a given target system link without the operator's knowing the makeup thereof. Therefore, while the invention has been described with respect to a preferred embodiment and several illustrative examples of usage thereof, it will be apparent to those of skill in the art that various implementations of the invention may be envisioned that would relocate the functional capacities of the user system, the LCSM, the LCCM and the various LCCs and various peer or nested or combined peer and nested hybrid configurations without departing from the spirit and scope of the invention. Additionally, the functions of the LCSM and LCCM and/or the user system may all be met by application programs themselves having little or no need for human interaction involved in their use. Therefore, what is described and what is intended to be protected by Letters Patent is set forth in the claims which follow by way of example only and not as limitation.

We claim:

1. A method of isolating and diagnosing problem conditions in an identified data communications network link connected to an identified target node, said method comprising steps of:

issuing, from a request control node containing it, a generic, non-device-specific problem determination request onto the data communications network, said request being for requesting problem determination to be performed on an identified communication link connected to an identified target node;

receiving on said data communications network said non-device-specific problem determination request at an intermediate control and translation means and, responsive to said non-device-specific problem determination request, issuing from said intermediate translation and control means at least one device-specific problem determination command on said identified communications link connected both to said intermediate translation and control means and to said identified target node;

receiving at said intermediate translation and control means on said identified communications link connected to said identified target node, at least one device-specific response from a device on said identified communication link, and;

responsive to said receipt by said intermediate translation and control means of said device-specific response, issuing by said intermediate translation and control means onto said communications link, further device-specific commands or issuing on said data communications network, general, non-device-specific problem identification diagnostic responses to said generic non-device-specific problem determination request from said request control node.

2. A method as described in claim 1, wherein:
said issuing of said device-specific problem determination commands is conducted serially by order of device interconnection in said communication link beginning with the device in said link nearest to said intermediate control and translation means.

3. A method as described in claim 1, further comprising a step at said intermediate translation and control means of:
retrieving communication link physical configuration data identifying the physical components of said identified communication link to said identified target node together with the physical characteristics of said components thereof that currently make up said identified communication link to said target node.

4. A method as described in claim 2, further comprising a step at said intermediate translation and control means of:
retrieving communication link physical configuration data identifying the physical component of said identified communication link to said identified target node together with the physical characteristics of said components thereof that currently make up said identified communication link to said identified target node.

5. A method as described in claim 1 or 2, or 3 or 4 for peer or nested interconnection of two or more intermediate translation and control means, further comprising steps of:
identifying at a first said intermediate translation and control means that said identified target node is served by a second said intermediate translation and control means; and
reissuing from said first intermediate translation and control means a generic, non-device-specific problem determination request to said second intermediate translation and control means, and;
issuing from said second intermediate translation and control means said device-specific commands on said identified communication link.

6. A method as described in claim 5, in which said generic, non-device-specific commands include a preliminary unique command identifying header, a command field and at least one command parameter identifying field.

7. Apparatus for diagnosing and controlling failure or problem conditions in a data communication network link, said link comprising one or more devices, said apparatus comprising:
a request control means having means for issuing onto said network, generic, non-device-specific problem determination request, communication link identification for identifying a specific communications link and target node identification for identifying a target node;
an intermediate translation and control means connected to said communication network for receiving said generic, non-device-specific problem determination request, communication link identification and target node identification and having means responsive to said non-device-specific requests, communication link identification and target node identification, for issuing at least one device-specific problem determination command to a device in said identified communication link to said identified target node; and
means at said intermediate translation control means for receiving a device-specific response from said device on said identified communication link and, responsive thereto, issuing further device-specific commands on said identified communications link or issuing generic non-device-specific problem identification diagnostic responses to said request control means.

8. Apparatus as described in claim 7, wherein:
said intermediate translation and control means issues said device-specific commands serially by device, beginning with the device in said identified communications link at the end of said link closest to said intermediate translation and control means.

9. Apparatus as described in claim 8, further comprising:
means for storing physical configuration data link component characteristics, identities and locations making up said communication link to said target node.

10. Apparatus as described in claim 7, further including means for storing physical configuration data link component characteristics, identities and locations making up said identified communication link to said target node.

11. Apparatus as described in claim 7, or 8 or 10 or 9, comprising two or more intermediate translation and control means connected together in peer or nested manner and further comprising:
means at a first said intermediate translation and control means for determining that said identified target node is served by a second said intermediate translation and control means and for reissuing said generic non-device-specific problem determination request to said second intermediate translation and control means for issuance therefrom of said device-specific commands on said identified communication link to said identified target node.

* * * * *